March 11, 1941.                B. B. SMITH                2,234,811
                              CATHEAD DRUM
                           Filed July 9, 1937              2 Sheets-Sheet 1
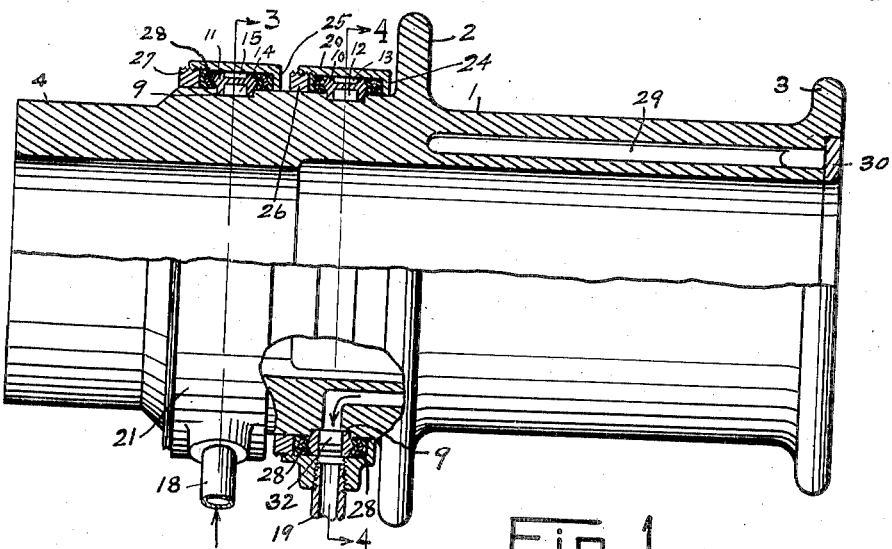
Fig. 1.
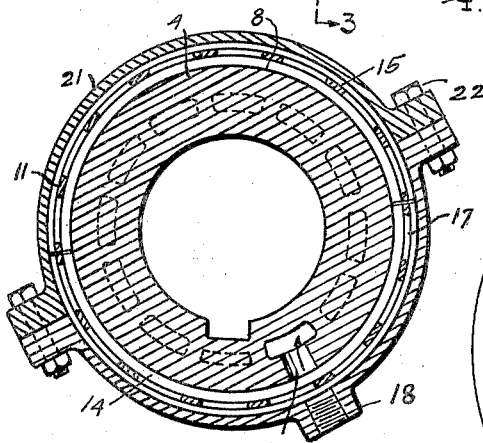
Fig. 3.
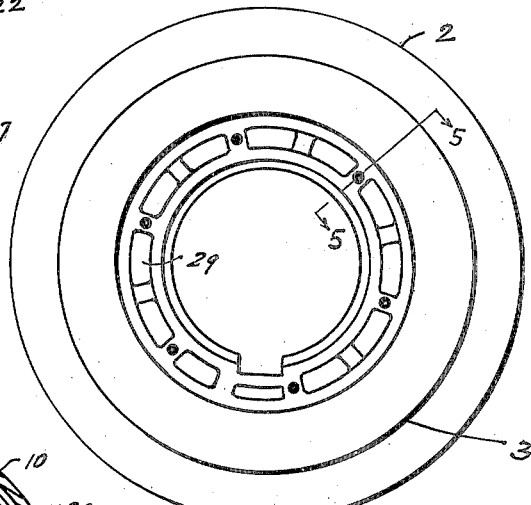
Fig. 2.
Fig. 4.
Inventor
Bernice B. Smith
By
Edward V. Hardway
Attorney March 11, 1941. B. B. SMITH 2,234,811
CATHEAD DRUM
Filed July 9, 1937 2 Sheets-Sheet 2

Inventor
Bernice B. Smith
By Edward V. Hardway
Attorney

Patented Mar. 11, 1941

2,234,811

UNITED STATES PATENT OFFICE 2,234,811

CATHEAD DRUM

Bernice B. Smith, Bay City, Tex.

Application July 9, 1937, Serial No. 152,727

6 Claims. (Cl. 242—117)

This invention relates to a cathead drum and has particular relation to means for cooling the drum.

An object of the invention is to provide a rotatable cathead drum having circulating channels therethrough with means providing for the circulation of a cooling fluid through said channels. Rotatable catheads are commonly employed for handling heavy loads and in use a cable is coiled about the cathead having one end attached to the load to be handled, with its other end arranged to be manipulated by the workmen whereby the cable may be caused to be frictionally engaged by the drum or released. In operation the friction generates heat and with high speeds or heavy loads or both, the heat is often sufficient to injure the cable as well as the cathead itself. It is an object of this invention to provide means for cooling the cathead.

With the above and other objects in view the invention has particular relation to certain novel features of construction, operation and arrangement of parts, an example of which is given in this specification and illustrated in the accompanying drawings, wherein—

Figure 1 shows a side view of the cathead, partly in section.

Figure 2 shows an outer end view showing the end plate removed.

Figure 3 shows a cross-sectional view taken on the line 3—3 of Figure 1.

Figure 4 shows a cross-sectional view taken on the line 4—4 of Figure 1.

Figures 8, 9:
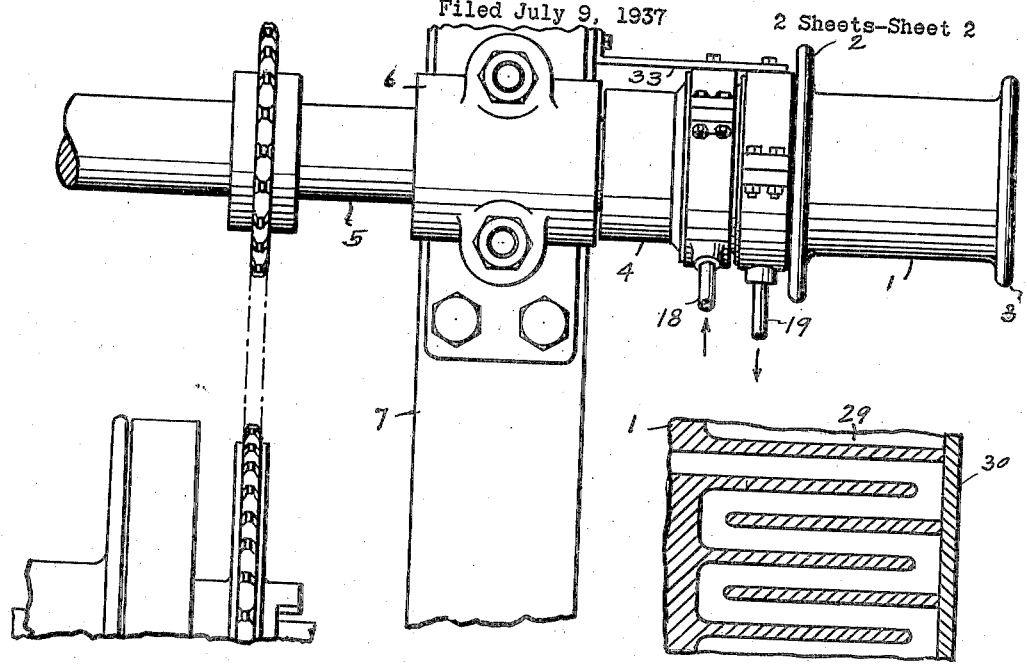
Figure 8 shows a side elevation of the cathead as mounted on the draw works of a drilling rig.
Figure 9 shows a fragmentary, sectional view of the head.
Figure 7:
Figure 7 shows a side elevation thereof, partly in section.
Figure 5:
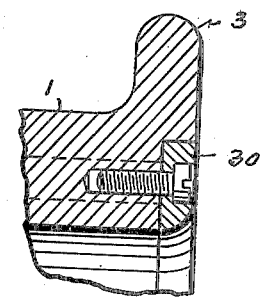
Figure 5 shows an enlarged, fragmentary, longitudinal, sectional view taken on the line 5—5 of Figure 2.
Figure 6:
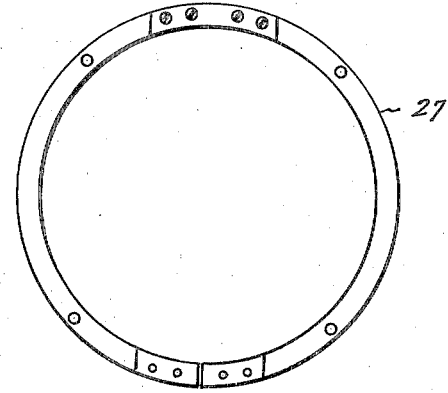
Figure 6 shows a plan view of a ring nut employed.

Referring now more particularly to the drawings wherein like numerals of reference designate similar parts in each of the figures, the numeral 1 designates a drum of the cathead type having the external annular retaining flanges 2, 3. At its inner end the drum is extended forming a hub 4. The structure above described is tubular and the hub is shaped to receive the end of the driving shaft 5 to which said hub is keyed or otherwise secured. The shaft 5 is mounted in the bearing 6 of the support 7 and may be driven in any suitable manner.

The hub 4 has the external annular grooves 8, 9 therearound and fitted into these grooves are the circular, channel shaped rings 10, 11 which are preferably formed of two arcuate sections, as shown in Figures 3 and 4 for convenience in assembly. The ring 10 has the inner and outer channels 12, 13 therearound and the ring 11 has the inner and outer channels 14, 15, therearound. The webs of the rings 10, 11, between said channels, are formed with the openings 16, 17, as shown in Figures 3 and 4 for the free circulation of the cooling fluid which is admitted into the channels of the ring 11 through the inlet pipe 18 and which is discharged through the discharge pipe 19. Surrounding the respective rings 10, 11 are the enclosing bands 20, 21. These bands are also preferably formed of arcuate sections whose abutting ends are bolted together by means of the bolts 22, 23. These respective bands have the inwardly turned flanges 24, 25, at one margin and at their other margins are internally threaded to receive the ring nuts 26, 27 which are screwed therein and fit closely around the hub 4. The inlet and outlet pipes 18, 19 are connected to said flanges as shown in Figures 1 and 8. Within the bands 20, 21 and on opposite sides of the rings 10, 11 is annular packing 28, said packing on one side being confined by the flanges 24, 25 and on the other side by the ring nuts 26, 27 so as to form fluid tight joints upon each side of the corresponding channels. The ring nuts 26, 27 may be tightened up to place the packing under the required pressure, the arrangement being such that upon the tightening up of a ring nut the pressure on opposite sides of the corresponding rings 10 or 11 will be equally applied.

There is a sinuous duct 29 within the walls of the drum 1 whose legs are preferably extended longitudinally of the drum and are connected at their inner and outer ends as more accurately shown in Figure 9, the outer ends of said legs being closed by the annular end plate 30 which is counter-sunk into the outer end of the cathead and secured thereto by suitable set screws. One end 31 of this duct is extended and connected into the inlet channel 14 and the other end, 32 of the duct is extended and connected into the outlet channel 12 whereby a continuous circulating duct is provided throughout the walls of the cathead 1 for the circulation of a cooling fluid therethrough. The drum 1 and its hub 4 rotates independently of the surrounding assemblies described which enclose the circulating channels 12, 13 and 14, 15. The said surrounding assemblies are anchored against rotation by means of the bracket 33 to which they are attached and which is firmly secured to the adjacent leg of the framework of the draw works. The cooling fluid is admitted through the inlet pipe 18 into the outer channel 14, and passes thence through the openings 17 into the inner channel 15 and thence passes into the inlet end of the duct 29 and passes back and forth through this duct following a sinuous course, thence passing through the outlet 32 of said duct into the channel 12 and thence outwardly through the openings 16, into the channel 13 and thence outwardly through the discharge pipe 19.

The drawings and description disclose what is now considered to be a preferred form of the invention by way of illustration only, while the broad principle of the invention will be defined by the appended claims.

What I claim is:

1. A rotatable cathead having a hub provided with external annular grooves therearound, said cathead being provided with a circulating conduit for cooling fluid whose ends terminate in said grooves, channel shaped rings around the grooves, bands around and inclosing said rings, inlet and outlet lines connected to the bands and communicating with the grooves.

2. In a cathead having a hub, stationary assemblies therearound, each assembly comprising a channel shaped ring adapted to surround the hub, an annular band around the ring having an inwardly extended flange at one margin and a ring nut at the other margin, packing at each side of the ring confined by said flange and ring nut respectively, each assembly confining an annular channel, said cathead having a conduit therein for the conduct of a cooling fluid, the ends of said conduit terminating in said channels.

3. In a cathead, having a hub, stationary assemblies therearound, each assembly comprising a sectional channel shaped ring, a sectional band around each ring, means for securing the sections of the band together, packing within the band on each side of the ring, means for confining said packing, said confining means including an adjustable nut for regulating the compression on the packing, said cathead having a conduit therethrough for the circulation of a cooling fluid, the ends of said conduit terminating in the channels of said rings and an inlet and an outlet pipe connected into said respective channels.

4. A rotatable cathead having a sinuous duct comprising a series of legs through the walls thereof which legs extend approximately from end to end of the cathead, an end plate on the outer end of the cathead and closing the outer ends of said legs, stationary means about the cathead, said cathead having channels enclosed by said stationary means, each channel being connected with said duct, and one channel being provided with an inlet and the other channel being provided with an outlet through which a cooling fluid may be supplied to and relieved from said duct to promote the circulation of fluid through the duct.

5. A rotatable cathead having a hub provided with external, annular grooves therearound, said cathead being provided with a circulating conduit for cooling fluid whose ends terminate in said grooves, rings around the grooves having a fluid passage therethrough, bands around and enclosing said rings, inlet and outlet lines connected to the bands and communicating with the grooves.

6. A fluid cooled cathead comprising a drum, annular retaining flanges on the drum, said drum being extended beyond one of said flanges, stationary means for conducting cooling fluid, surrounding said extended end of the drum and in sealing relationship therewith and enclosing annular channels on the extension of the drum one being provided with an inlet and the other being provided with an outlet, said drum having a passageway therethrough for the circulation of a cooling fluid, the ends of the passageway terminating in the respective channels.

BERNICE B. SMITH.